United States Patent
Sato et al.

[11] Patent Number: 6,159,274
[45] Date of Patent: Dec. 12, 2000

[54] COLORING MECHANISM AND A RECORDING MATERIAL WITH THE MECHANISM

[75] Inventors: Kazuo Sato, Shizuoka; Takeshi Kanazaki, Tokyo, both of Japan

[73] Assignee: Nisshinbo Industries, Inc., Tokyo, Japan

[21] Appl. No.: 09/220,675

[22] Filed: Dec. 23, 1998

[30] Foreign Application Priority Data

Dec. 26, 1997 [JP] Japan ................................. 9-366759
Jun. 1, 1998 [JP] Japan ................................. 10-165824

[51] Int. Cl.[7] ............................. C09D 11/00; B42D 15/00
[52] U.S. Cl. ................................. 106/31.14; 106/31.32; 106/31.64; 283/94; 283/100; 283/101; 283/903
[58] Field of Search .................... 106/31.14, 31.32, 106/31.64; 283/94, 100, 101, 903

[56] References Cited

U.S. PATENT DOCUMENTS

| | | |
|---|---|---|
| 4,111,462 | 9/1978 | Lange et al. ................... 106/31.14 |
| 4,241,942 | 12/1980 | Bachman ........................ 283/94 |
| 4,273,362 | 6/1981 | Carrier et al. ................. 283/94 |
| 4,536,218 | 8/1985 | Ganho ........................... 283/903 |
| 4,726,608 | 2/1988 | Walton ........................... 283/903 |
| 4,935,401 | 6/1990 | Pendergrass, Jr. ............ 503/206 |
| 5,215,576 | 6/1993 | Carrick ........................ 106/31.64 |
| 5,228,692 | 7/1993 | Carrick et al. ............... 283/101 |
| 5,542,710 | 8/1996 | Silverschotz et al. ........ 283/94 |
| 5,601,887 | 2/1997 | Rich et al. .................... 283/94 |

*Primary Examiner*—Helene Klemanski
*Attorney, Agent, or Firm*—Rogers & Killeen

[57] ABSTRACT

The present invention provides a coloring mechanism in which hidden letters (including numbers), figures, symbols, images etc. appear by rubbing the surface with metal such as coins etc., and to a recording material provided with this mechanism. In the coloring mechanism of the invention, letters etc. are indicated on a recording face by an ink etc. containing an inorganic pigment with a Mohs hardness of 2 or more, so as to have the same color as or a similar color to the recording face, and the letters etc. are colored to be readable by rubbing with metal the recording face containing the letters etc.

18 Claims, 1 Drawing Sheet

COLORING MECHANISM AND A RECORDING MATERIAL WITH THE MECHANISM

BACKGROUND OF THE INVENTION

1. Field of the Invention

The present invention relates to a coloring mechanism in which hidden letters (including numbers), figures, symbols, images etc. or characters (hereinafter referred to as "letters etc.") appear by rubbing surfaces with metal such as coins etc., and to a recording material provided with this mechanism.

2. Prior Art

In place of forgeable magnetic cards, scratch cards on which hidden letters etc. appear by rubbing their surfaces with coins etc. are widely used as prepaid cards for international telephone, internet, portable telephone etc. and as cards in a lottery for the convenience of revealing hit or miss at once.

Such scratch cards have letters etc. printed with UV hardening ink, dye ink, pigment ink etc. on a part or the whole of their surfaces where the letters etc. are hidden with silver- or gold-colored highly opaque masking materials, and the letters etc. hidden therein appear by removing the silver- or gold-colored masking materials by rubbing their surfaces with coins etc.

However, conventional scratch cards have the problem that if the masking materials with an e.g. silver or gold color are rubbed with coins etc., the resulting powder from the masking materials is generated to make hands, clothes dirty.

Another problem is that during transportation, the surfaces of scratch cards may be hit by a hard material by accident to cause removal of the silver- or gold-colored masking materials so that letters etc. hidden therein may appear.

A further problem is that if conventional scratch cards are rubbed with hard materials such as coins, printed letters etc. may be removed together with masking materials, so some cards require transparent varnish applied onto the face of printed letters etc., thus making the process cumbersome and increasing the production cost.

In view of the problems of the conventional scratch cards, the object of the present invention is to provide a new mechanism in which from a completely different viewpoint, letters etc. are made readable by rubbing with metal such as coins, as well as a recording material with the mechanism, for example a recording material with the new mechanism which can be preferably used not only in scratch cards but also in various cards, papers used in notebooks, copies, printers etc., decorative sheets, stickers, calendars, various slip papers, papers for manuals, and contracts for the purpose of hiding letters, as well as in various OA instruments, home electronic appliances, office instruments, and office supplies in order to provide them with production numbers, production dates, or serial numbers etc. for computer program in hidden forms.

SUMMARY OF THE INVENTION

One constitution of the coloring mechanism of the present invention made for the purpose of solving the object is characterized in that letters etc. are indicated on a recording face by ink etc. containing an inorganic pigment with a Mohs hardness of 2 or more, so as to have the same color as or a similar color to said recording face, and the letters etc. are colored to be readable by rubbing with metal the recording face containing the letters etc. Another constitution of the coloring mechanism of the present invention is characterized in that letters etc. indicated on a recording face by ink etc. containing an inorganic pigment with a Mohs hardness of 2 or more, and an indication making said letters etc. unreadable by ink etc. containing a pigment, and/or, a dye, a resin with lower hardness than said pigment and having the same color as or a similar color to said ink etc., are indicated in combination and the letters etc. are colored to be readable by rubbing with metal the recording face containing the letters etc. and the indication.

One constitution of the recording material of the present invention with the coloring mechanism of the above-described invention is characterized in that letters etc. are indicated on a part or the whole of at least one side of a base material as a recording face by ink etc. containing an inorganic pigment with a Mohs hardness of 2 or more, so as to have the same color as or a similar color to said recording face, and the letters etc. are colored to be readable by rubbing with metal the recording face containing the letters etc. Another constitution of the recording material of the present invention with the coloring mechanism of the above-described invention is characterized in that letters etc. indicated on a part or the whole of at least one side of a base material as a recording face by ink etc. containing an inorganic pigment with a Mohs hardness of 2 or more, and an indication making said letters etc. unreadable by ink etc. containing a pigment, and/or, a dye, a resin with lower hardness than said pigment and having the same color as or a similar color to said ink etc., are indicated in combination and the letters etc. are colored to be readable by rubbing with metal the recording face containing the letters etc. and the indication.

The recording face of the recording material may be a part or the whole of not only one side but also both sides of the base material, or may be a part or the whole of the surface of a recording layer provided on the base material.

That is, the system (mechanism) in which conventional scratch cards are rubbed with coins to remove their masking materials thereby permitting letters etc. hidden therein to be readable has reached the limit for the reason described above, so the present inventors made extensive study for the purpose of developing a new mechanism in which letters etc. indicated so as to be unreadable on a recording material are made readable without generating abraded powder from the material by rubbing it with metal such as coins, and as a result, they found that an inorganic pigment with a Mohs hardness of 2 or more contained in ink etc. abrades the surface of a metal upon contacting the letters etc. and its trace remains on the recording face, to arrive at one of the present inventions. Further, because even if letters etc. are indicated on a recording face by a different color to that of said recording face, the letters etc. are unreadable if an indication having the same color as or a similar color to the letters etc. is indicated in combination on the recording face, the present inventors found that if a pigment, and/or, a dye, a resin with lower hardness than said inorganic pigment with a Mohs hardness of 2 or more contained in ink etc. or letters etc. is contained in ink etc. for making the indication, letters etc. are colored to be readable by rubbing the recording material with metal, to arrive at another present invention.

Figure 1:
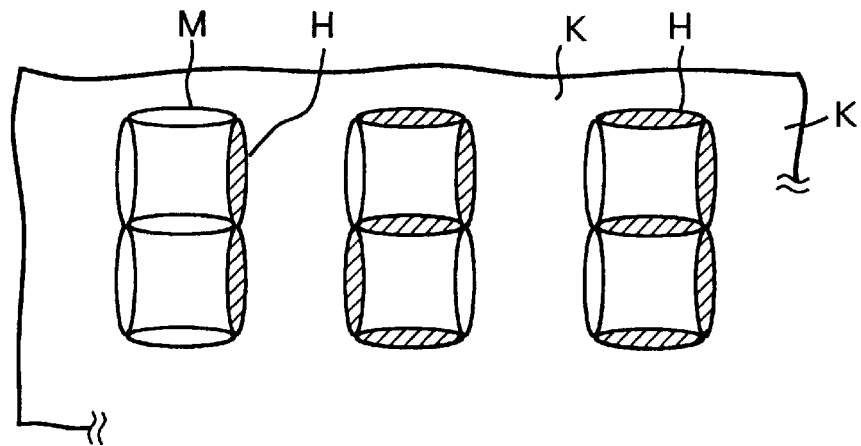
FIG. 1 is a plan view showing one example of the recording material of the present invention after portions to be indicated on the recording face were rubbed with metal.

In the drawings, the meanings of the symbols are as follows:

K: the recording face of the recording material;
H: portions which were colored; and
M: portions which were not colored.

DESCRIPTION OF THE PREFERED INVENTION

Hereinafter, the constitutional examples of the coloring mechanism of the present invention are described first in detail, and the constitutional examples of the recording material with this mechanism are then described.

The coloring mechanism of the present invention is a mechanism in which letters etc. indicated so as to be unreadable on a recording face are colored and readable by rubbing the recording face with metal such as coin etc., where the letters etc. are made readable by rubbing the recording face with metal but are not made readable by rubbing with a material other than the metal, such as plastic.

According to one coloring mechanism of the present invention, letters etc. are indicated to be unreadable, so the letters etc. indicated on the recording face should have the same color or a similar color to that of the recording face. According to another coloring mechanism of the present invention, letters etc. and an indication with the same color or a similar color are indicated in combination on the recording face to make the letters etc. unreadable.

To make the color of letters etc. identical or similar to that of the recording face, the type and content of pigment and dye contained in ink etc. for indicating letters etc. are important, and if two or more pigments or dyes are used, it is also important to adjust the mixing ratio thereof. If the recording face is white, a white pigment can be used as such, but if the recording face is colored e.g. pale yellow or blue, it is necessary to select pigment or dye for adjustment.

The pigment includes organic pigment and inorganic pigment, and in the mechanism of the present invention, at least inorganic pigment should be contained in ink etc. for indicating letters etc.

The inorganic pigment includes colorless pigments and colored pigments such as white pigments (titanium white, zinc white, basic carbonate white lead, lithopone etc.), black pigments (carbon black, iron black etc.), yellow pigments (chrome yellow, cadmium yellow, cobalt yellow etc.), orange pigments (molybdenum red etc.), red pigments (cadmium red, red oxide, red lead oxide etc.), blue pigments (ultramarine, Prussian blue etc.), green pigments (cobalt green, chromium green etc.) etc., and pigments causing letters etc. to have the same color as or a similar color to the color of the recording face should be selected. Further, inorganic and organic pigments may be used in combination at a suitable mixing ratio to permit the indicated letters etc. to have the same color as or a similar color to that of the recording face, and dyes can also be added for adjustment of the color.

When letters etc. indicated on the recording face have the same color as or a similar color to that of the recording face, the letters etc. indicated thereon can usually not be distinguished from the recording face with the naked eye, but when they are different in brightness or chroma, they may possibly be distinguished. The confirmed range in which letters etc. are almost undistinguishable according to one of the coloring mechanisms of the present invention is that the whiteness degree of indicated letters etc. based on JIS-P-8123 is the range of preferably $P\pm5\%$, more preferably $P\pm3\%$, relative to the whiteness degree P of the recording face, but it is also possible that even in a broader range, letters etc. cannot be distinguished depending on the relationship with the type, density etc. of color. This range of whiteness degree is applied not only to white letters etc. indicated on a white recording face by ink etc. containing white pigments but also to e.g. pale yellow or pink letters etc. indicated on a pale yellow or pink recording face, respectively.

In the other coloring mechanism of the present invention, letters etc., and an indication with the same color as or a similar color on a recording face are indicated in combination thereby making the letters etc. unreadable. In this case, the whiteness degree of letters etc. based on JIS-P-8123 is in the range of preferably $Q\pm5\%$, more preferably $Q\pm3\%$, relative to the whiteness degree Q of the indication. As a matter of course, there are cases where letters etc. are not distinguished even in a broader range than $Q\pm5\%$, depending on the relationship with the type, density etc. of color.

In both the coloring mechanisms of the present invention, various embodiments such as handwriting, painting a thin plate over except for letters etc., transfer etc. in addition to usual printing means can be used to indicate letters etc. and an indication on the recording face.

According to the coloring mechanism of the present invention, an inorganic pigment is necessarily contained in ink etc. for indicating letters etc. as described above, so that when the recording face containing indicated letters etc. is rubbed with metal, the inorganic pigment contained in the indicated letters etc. abrades the metal surface in contact therewith, and very fine metal powder thus abraded adheres to the portion of the letters etc. to permit that portion to have the same color as or a similar color to that of the metal. The ink etc. include coating, paint, crayon etc. containing inorganic pigment.

To permit the surface of the metal to be abraded with the inorganic pigment so that the portion of letters etc. turns the same color as or a similar color to that of the metal, the inorganic pigment should have a Mohs hardness of 2 or more. This is because the hardness of the inorganic pigment is naturally preferably the same as or higher than the hardness of the metal in contact therewith, and as a result of their further extensive study, the present inventors found that coloration occurs even if the hardness of the metal is higher than that of the inorganic pigment, and confirmed that ink etc. containing an inorganic pigment with a Mohs hardness of 2 or more can be used for constituting the coloring mechanism of the present invention described above, taking in consideration that the Mohs hardness of widely used metal ranges from 1.5 to 4.5.

In the coloring mechanism in the present invention, if coloration of the letters etc. can be distinguished from the indication and are readable when the recording face is rubbed with metal such as coin etc., an inorganic pigment with high Mohs hardness may be contained in a certain amount in ink etc. for the indication. The relationship in Mohs hardness between the pigment contained in letters etc. indicated on the recording face and the pigment in ink etc. for an indication may be the reverse of the relationship in the previously described example. It is preferable for the whiteness degree of colored letters etc. and an indication to exceed the range Q±5% in order that the colored letters etc. can be distinguished from the indication and are readable.

The subject to which the coloring mechanism of the present invention is applied is not limited, and for example, a recording face is formed by printing, coating etc. on apart of the bottoms, backs etc. of home electronic appliances, OA instruments, office supplies, telephone instruments etc., in order to indicate production numbers or recognition numbers of the products in hidden forms on the recording face and to make them readable by rubbing with metal when necessary, or besides scratch cards, letters and signatures in contracts etc. or answers in a collection of problems for studying are indicated in hidden forms and can be made readable by rubbing them with metal. In the coloring mechanism of the present invention, the characters indicated on the recording face are not colored by rubbing them with plastic because the inorganic pigment is unable to abrade the plastic due to the density of the surface of the plastic.

Now, the constitutional examples of the recording material of the present invention with the above coloring mechanism of the present invention are described in detail. That is, the recording material of the present invention includes a material having a recording face formed on a part or the whole of at least one side of a sheet- or board-shaped base material or a material having a recording layer suitable for printing etc. provided on a base material, the recording layer having a recording face thereon to which the coloring mechanism of the present invention is applied.

The base material used in the recording material of the present invention may be any base material capable of indication by printing etc., and examples are general papers such as high-quality paper, Kent paper, coating paper etc., and plastic films of polypropylene, polyethylene terephthalate, polyvinyl chloride, polystyrene or foams thereof, or films thereof further containing inorganic fillers such as calcium carbonate etc. The base material may be not only in the form of film or sheet, but also in the form of board. Biodegradable plastics can also be used as films for the base material. Hereinafter, these base materials are described in detail.

The base material used in the present invention is mainly a plastic film and paper, and is suitably used depending on uses. For example, the base material for prepaid cards used in many cases for a predetermined period of time for international telephone, internet etc. requires durability, so plastic films excellent in anti-folding properties and water resistance are more preferable than paper. The plastic films preferably used are not particularly limited insofar as their surface is smooth, and examples include films such as polypropylene, polyethylene terephthalate, polyvinyl chloride, polystyrene etc. Particularly preferred are plastic films containing fine hollows in these films. The hollow-containing plastic films naturally include foamed plastic films. Here, the "hollow" refers not only to cells but also to voids and vacuoles etc. formed inside.

The particularly superior feature of the hollow-containing plastic film as the base material is that incorporation of fine hollows into the plastic film leads to improvements in flexibility to make the film strong against bending, and that although the recording layer may be removed upon strong rubbing with coins etc. in the case of a rigid base material, use of the sufficiently flexible hollow-containing plastic film as the base material can absorb the pressure from coins to prevent removal of the recording layer.

The hollow content of the hollow-containing plastic film ranges from 10 to 60% by volume. This is because if the hollow content of the film is 10% by volume or more, flexibility can be imparted to prevent removal of the recording layer upon rubbing with coins. On the other hand, the hollow content of the film is 60% by volume or less, it is possible to obtain a sturdy film having enough mechanical strength for use in various cards.

The hollow content V (% by volume) is determined according to the following equation:

$$V=[1-\rho^1/\Sigma(\rho_n \times \text{mixing ratio})] \times 100$$

In the above equation, $\rho_n$ is the true density (g/cm$^3$) of each material used for production of a plastic film as the base material, and $\rho^1$ is the apparent density (g/cm$^3$) of the plastic film. Here, the apparent density $\rho^1$ (g/cm$^3$) was determined by cutting an arbitrary portion of a plastic film into S squares (10 cm×10 cm), measuring the thickness of arbitrary 9 sites thereof by a micrometer, determining its volume from the average thickness, measuring the weight of the cut sample to calculate its weight per 1 cm$^3$, and obtaining the average of 5 samples. The mixing ratio is a volume ratio relative to the total volume (=1) of the respective materials used for producing the plastic film.

Because prepaid cards become invalid after use for a predetermined period of time, their disposal should also be considered. A preferable base material selected from this viewpoint is a biodegradable plastic film conferring adequate durability on prepaid cards, hardly damaging a combustion furnace by virtue of low combustion energy upon combustion, and being degradable by microorganisms upon disposal in the natural environment. Such biodegradable plastic films include starch+denatured PVA mixtures, polybutylene succinate/adipate copolymers, polycaprolactone, polyhydroxybutyrate/valerate copolymers, polylactic acid etc.

On the other hand, e.g. cards for lottery which are used for a relatively short period do not require so high durability, and thus it is not necessary to pay special attention to the disposal of the base material suitable for such application, and relatively inexpensive papers are preferably used. Such papers include high-quality paper, card paper, board paper, coating paper etc., but papers with rough surfaces easily cause inadequate transfer of ink in the place where the ink is in insufficient contact with the recording face, so the particularly preferable base material is a coating paper having a resin applied on the surface thereof to improve smoothness.

The coating paper having a resin applied on the surface thereof for improving smoothness can be preferably used as the base material because the contact of the ink with the recording face is sufficient upon printing, and insufficient transfer hardly occurs, so there is less danger that improper articles are put on the market, while if papers with rough surfaces are applied to the base material of the recording material of the present invention with the property that insufficient transfer of the ink is difficult to find as compared with conventional printed matter because portions printed are indicated so as to have the same color as or a similar color to that of the printing face, or portions printed are indicated so as to have the same color as or a similar color by 2 or more inks on the printing face, then improper articles may be put on the market because hidden letters etc. could not be read due to insufficient transfer of the ink for the reason of e.g. inadequate quality control.

Such coating papers are preferably those with a Beck smoothness of 100 seconds or more based on JIS-P-8119, more preferably those further calendered for improving smoothness after applying a resin. The resin to be applied onto the surface of the coating paper includes styrene/ butadiene copolymers, acrylic resin, urethane resin etc., and such resin has better compatibility with a hydrophobic resin for ink than paper cellulose fibers, so the ink can be easily transferred upon printing, resulting in the particular effect of preventing insufficient transfer of ink, with the further effect of improving water resistance.

The recording face of the recording material of the present invention is formed on a part or the whole of at least one side of the base material, and the recording face may be provided directly on the base material or may be provided on a part or the whole of the surface of a recording layer provided on the base material. This recording layer can be provided on the surface of the base material by applying a coating liquid containing a suitable binder resin, or a binder resin and fillers or by adhesive-bonding a thin sheet-shaped film to the surface of the base material. Further, the recording face can also be applied and formed by applying a white or suitably colored coating liquid onto the base material or the recording layer.

Now, the ink etc. used for indicating letters etc. on the recording face in the recording material of the present invention, and the ink etc. used for indicating a combination of letters etc., and an indication with the same color or a similar color on the recording face to make the letters etc. unreadable, are described.

First, the former ink etc. for printing etc. of letters etc. to be indicated in a hidden form in the recording face make the color of the letters etc. identical or similar to that of the recording face, as described above for the mechanism of the present invention. That is, the inorganic pigment contained in the ink etc. may be not only a white pigment but also an inorganic pigment causing the indicated letters etc. to have the same color as or a similar color to the color of the recording face, and further organic pigments and dyes can also be added for adjustment of the color.

The ink etc. contain a pigment with a Mohs hardness of 2 or more, preferably 3 or more, and simultaneously have a whiteness degree of the printed letters etc. based on JIS-P-8123 within the range of preferably P±5%, more preferably P±3%, relative to the whiteness degree P % of the recording face adjacent to said letters etc.

Then, the latter ink etc. used for a combination of letters and an indication with the same color or a similar color on the recording face are described. In this latter case, too, the ink etc. for indicating letters etc. contain a pigment with a Mohs hardness of 2 or more, preferably 3 or more. On the other hand, the ink etc. for indicating an indication contains a pigment, and/or, a dye, a resin with lower Mohs hardness than said inorganic pigment. This is because the colored letters etc. can be distinguished from the indication and are thus readable. In some cases, the ink etc. for indicating an indication does not any inorganic pigment. The color of the letters etc. and of an indication may be different from the color of the recording face, but the whiteness degree of letters etc. based on JIS-P-8123 should be within the range of preferably Q±5%, more preferably Q±3%, relative to the whiteness degree Q of the indication.

In the above, the Mohs hardness is determined by scratching or pushing samples against each other to examine which sample is hurt, and a large number of Mohs hardness indicates higher rigidity. Table 1 shows standard substances for Mohs hardness.

TABLE 1

| Standard Substance | Mohs Hardness |
| --- | --- |
| Talc | 1 |
| Gypsum | 2 |
| Calcite | 3 |
| Fluorite | 4 |
| Apatite | 5 |
| Orthoclase | 6 |
| Quartz | 7 |
| Topaz | 8 |
| Corundum | 9 |
| Diamond | 10 |

When letters etc. indicated with ink etc. containing a pigment with a Mohs hardness of 2 or more are rubbed with metal, the surface of the metal is removed and the removed metal powder adheres to the portion of the letters etc. indicated by printing etc. of the ink etc., to show the color of the metal. However, although the relationship between pigment hardness and metal hardness is as described above, it is not necessary for metal hardness to be lower than pigment hardness, and the present invention encompasses the case where metal hardness is higher than pigment hardness.

The pigment with a Mohs hardness of 2 or more includes kaolin (Mohs hardness of 2 to 2.5), calcined kaolin (Mohs hardness of 2 to 3), calcium carbonate (Mohs hardness of 3), aluminum hydroxide (Mohs hardness of 3), barium sulfate (Mohs hardness of 3 to 3.5), perlite (Mohs hardness of 5), anatase titanium oxide (Mohs hardness of 5 to 6), rutile titanium oxide (Mohs hardness of 6 to 7), calcinated diatomaceous earth (Mohs hardness of 6 to 7), γ-alumina (Mohs hardness of 5 to 6), α-alumina (Mohs hardness of 9) etc.

The Mohs hardness of typical metals used in the recording material of the present invention is shown in Table 2.

TABLE 2

| Substance | Mohs Hardness |
| --- | --- |
| Lead | 1.5 |
| Tin | 1.8 |
| Pure aluminum | 2 |
| Gold | 2.5 |
| Silver | 2.7 |
| Copper | 3 |
| Nickel | 3.8 |
| Platinum | 4.3 |
| Iron | 4.5 |

If the whiteness degree of letters etc. indicated by printing etc. on the recording face is outside of the range of P±5% relative to the whiteness degree P % of the recording face adjacent to the indicated letters etc., the brightness and chroma of the recording face are significantly different from those of the indicated letters etc., so the indicated letters etc. may be readable with the naked eye.

The letters etc. may be indicated on the recording face by e.g. printing a combination of general inks such as UV hardening ink, dye ink, pigment ink etc., and indication means may be hand-writing, painting over except for letters etc., transfer etc. besides printing. Further, coating, paint, crayon etc. can also be used for indication in addition to ink.

The coloring mechanism and the recording material of the present invention are as described above, and according to the present invention, hidden letters are made readable by coloration upon rubbing with metal, so conventionally required masking materials for shielding letters etc. are not required, so abraded powder from the masking materials is not generated and clothes etc. are not made dirty. There is also the special effect that because the recording material of the present invention is not colored without rubbing with metal such as coins etc., the hidden letters etc. do not appear even if the surfaces of scratch cards etc. may be hurt by accident during transportation.

Further, the present invention can be preferably used not only in scratch cards but also in various cards, papers used in notebooks, copies, printers etc., decorative sheets and stickers, calendars, various slip papers and papers for manuals and contracts for the purpose of hiding letters, and in various OA instruments, home electronic appliances, office instruments, and office supplies in order to provide them with production numbers, production dates or serial numbers etc. for computer program in hidden forms.

Further, according to the present invention, it is only necessary for letters etc. hidden to be indicated with the same color as or a similar color to that of the recording face, and it is not necessary to provide a masking material for shielding letters etc. printed on the base material such as in conventional scratch cards etc., or to protect the surface of letters with varnish etc. in order to prevent the letters etc., together with the masking material, from being abraded with coins etc., so extremely low production costs are achieved.

Further, according to the present invention, letters etc. and an indication with the same color or a similar color are indicated in combination on a recording face thereby making the letters etc. unreadable, and these are rubbed with metal to permit the letters etc. to be colored to enable reading thereof, so there is the unique effect of a wide application range such as in answers to questions and hidden pictures.

EXAMPLES

Hereinafter, the examples of the recording material with the coloring mechanism of the present invention are described.

In the majority of these examples, white letters etc. were indicated with an ink containing a white pigment on a white recording face by means of printing etc., but the color of the recording face and letters etc. are not limited to white. Further, the color of the letters etc. and the indication with the same color or a similar color indicated on the recording face is not limited to white or may be a different color than that of the recording face.

Example 1

A hollow-containing polyethylene terephthalate film (Lumilar E 62, 188 µm, whiteness degree P=89%, hollow content of 28%, Toray Industries, Inc.) was used as the base material.

20 parts by weight of calcined kaolin (Alto White TE with a Mohs hardness of 2, Georgia Kaolin Co., Ltd.) was mixed with a solution prepared by dissolving 15 parts by weight of urethane resin in 100 parts by weight of a mixed solvent of methyl ethyl ketone:toluene:ethyl acetate=1:1:1 followed by stirring to give a white ink. This white ink was gravure-printed on the above base material by means of a gravure coater using a gravure plate engraved with the letters of A, B, and C, whereby the recording material of the present invention was obtained. The whiteness degree of the letters was 93%. It was difficult to distinguish the printed letters, but when the portion of the letters was rubbed with a lead bar, the letters turned a lead color to permit identification of the letters.

Example 2

The recording material of the present invention was obtained in the same manner as in Example 1 except that biodegradable plastics (Lacea, 190 µm, whiteness degree P=92% Mitsui Chemicals, Inc.) were used as the base material and calcium carbonate (light calcium carbonate with a Mohs hardness of 3, Marumo Calcium Co., Ltd.) was used as white pigment. The whiteness degree of the letters was 91%. It was difficult to distinguish the printed letters, but when the portion of the letters was rubbed with a copper bar, the letters turned a red copper color to permit identification of the letters.

Example 3

The recording material of the present invention was obtained in the same manner as in Example 1 except that a coating paper (OK Special Art 104.7 g/m$^2$, whiteness degree P=86%, Beck smoothness of 400 sec., Oji Paper Co., Ltd.) was used as the base material and the white pigment was calcinated diatomaceous earth (Radio Light F with a Mohs hardness of 7, Showa Chemical Industry Co., Ltd.) was used as white pigment. The whiteness degree of the letters was 85%. It was difficult to distinguish the printed letters, but when the portion of the letters was rubbed with a lead bar, the letters turned a lead color to permit identification of the letters. Further, removal of the ink from the letters was not observed.

Example 4

A hollow-containing polyethylene terephthalate film (Crisper G2323, 188 µm, hollow content of 21%, Toyobo Co., Ltd.) was used as the base material, and the base material was gravure-printed with a yellow ink to form a recording face.

20 parts by weight of calcined kaolin (Alto White TE with a Mohs hardness of 2, Georgia Kaolin Co., Ltd.) as an inorganic pigment was mixed with a solution prepared by dissolving 15 parts by weight of urethane resin in 100 parts by weight of a mixed solvent of methyl ethyl ketone:toluene:ethyl acetate=1:1:1 followed by stirring to give an ink for letters etc. This ink was gravure-printed with crosswise lines on the recording face so that the numbers of 1, 2 and 3 were given thereon. The whiteness degree of the letters was 93%.

20 parts by weight of organic fillers (organic fillers produced by Nippon Kasei Chemical Co., Ltd.) as coloring materials were mixed with a solution prepared by dissolving 15 parts by weight of urethane resin in 100 parts by weight of a mixed solvent of methyl ethyl ketone:toluene:ethyl acetate=1:1:1 followed by stirring to give an ink for making an indication which was then gravure-printed on the recording face with crosswise lines so that the above numbers of 1, 2 and 3 looked like the number of 8, whereby the recording material of the present invention was obtained. The whiteness degree Q of the crosswise lines was 90%. Every printed portion looked like the number of 8 and it was difficult to recognize the numbers of 1, 2 and 3, but when the portion of the letters on the recording material was rubbed with a copper bar, the portion of the numbers of 1, 2 and 3 turned a red copper color to permit identification of the numbers as shown in FIG. 1. In FIG. 1, K is the recording face of the recording material, H is the colored lines out of the crosswise lines, and M is the portion which was not colored.

Example 5

The recording material of the present invention was obtained in the same manner as in Example 4 except that biodegradable plastics (Lacea, 190 µm, Mitsui Chemicals, Inc.) was used as the base material and calcinated diatomaceous earth (Radio Light F with a Mohs hardness of 7, Showa Chemical Industry Co., Ltd.) was used as the inorganic pigment. The numbers of 1, 2, and 3 had a whiteness degree of 85% and the whiteness degree Q of the crosswise lines was 90%. Every printed portion looked like the number of 8 and it was difficult to recognize the numbers of 1, 2 and 3, but when the portion of the letters was rubbed with a copper bar, the portion of the numbers 1, 2 and 3 turned a red copper color to permit identification of the numbers, as shown in FIG. 1.

Comparative Example 1

A recording material was obtained in the same manner as in Example 1 except that a white polyethylene terephthalate film (Merinecks 339, 188 μm, whiteness degree P=94%, du Pont) was used as the base material and talk (Highmicron HE-5 with a Mohs hardness of 1, Takehara Kagaku Kogyo Co., Ltd.) was used as white pigment. The whiteness degree of the letters was 90%. It was difficult to distinguish the printed letters, and although the portion of the letters was rubbed with a lead bar, the color of the letters did not change so identification of the letters was difficult.

Comparative Example 2

The recording material of the present invention was obtained in the same manner as in Example 1 except that a high-quality paper (OKH 127.9 g/m², whiteness degree P=80%, Beck smoothness of 20 sec., Oji Paper Co., Ltd.) was used as the base material and calcinated diatomaceous earth (Radio Light F with a Mohs hardness of 7, Showa Chemical Industry Co., Ltd.) was used as white pigment. The whiteness degree of the letters was 85%. It was difficult to distinguish the printed letters, and when the portion of the letters was rubbed with a lead bar, the letters turned a lead color, but removal of the letters was observed due to insufficient transfer of the ink.

Comparative Example 3

Figure 2:
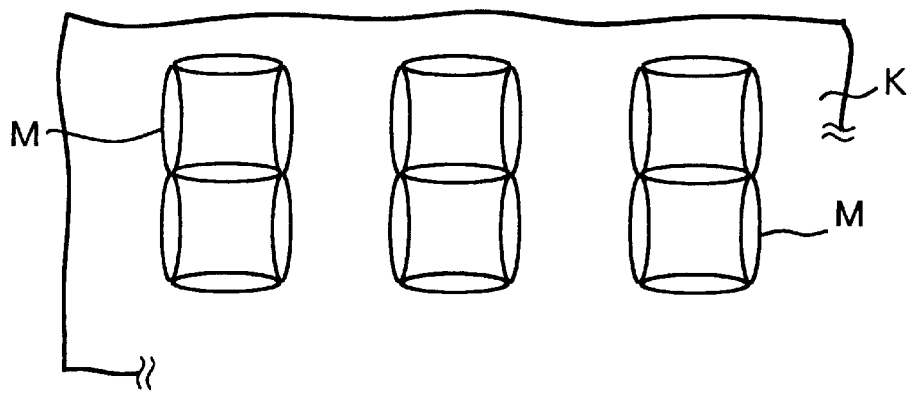
FIG. 2 is a plan view showing the recording material in Comparative Example 3 after portions to be indicated on the recording face were rubbed with metal.

A recording material was obtained in the same manner as in Example 4 except that an inorganic pigment-containing polyethylene terephthalate film (Lumilar E 22, 188 μm, Toray) was used as the base material and talk (Highmicron HE-5 with a Mohs hardness of 1, Takehara Kagaku Co., Ltd.) was used as the inorganic pigment. The numbers of 1, 2, and 3 had a whiteness degree of 90% and the whiteness degree Q of the crosswise lines was 90%. Every printed portion looked like the number of 8 and it was difficult to recognize the numbers of 1, 2 and 3, and although the portion of the letters was rubbed with a copper bar, the color of the letters did not change, so identification of the numbers of 1, 2 and 3 was difficult as shown in FIG. 2. In FIG. 2, K is the recording face and M is the portion which was not colored.

Comparative Example 4

Figure 3:
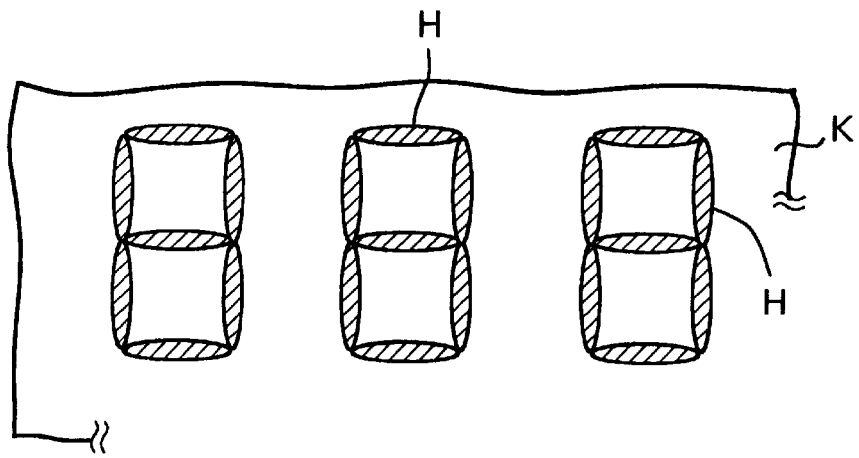
FIG. 3 is a plan view showing the recording material in Comparative Example 4 after portions to be indicated on the recording face were rubbed with metal.

A recording material was obtained in the same manner as in Example 4 except that calcium carbonate (light calcium carbonate with a Mohs hardness of 3, Maruo Calcium Co., Ltd.) was used as the inorganic pigment, and calcinated kaolin (Alto White TE with a Mohs hardness of 2, Georgia Kaolin Co., Ltd.) was used as the coloring material. The numbers of 1, 2, and 3 had a whiteness degree of 91%, and the whiteness degree Q of the crosswise lines was 93%. Every printed portion looked like the number of 8 and it was difficult to recognize the numbers of 1, 2 and 3, and although the portion of the letters was rubbed with a copper bar, every printed portion looked like the number of 8, so identification of the numbers of 1, 2 and 3 was difficult as shown in FIG. 3. In FIG. 3, K is the recording face and M is the colored portion.

In Examples 1 to 5 and Comparative Examples 1 to 4, the results of identification of letters etc., anti-rubbing properties and decomposition properties are shown in Table 3.

TABLE 3

| | Identification of letters etc. | Anti-rubbing properties | Decomposition properties |
|---|---|---|---|
| Example 1 | ○ | ○ | X |
| Example 2 | ○ | X | ○ |
| Example 3 | ○ | X | ○ |
| Example 4 | ○ | ○ | X |
| Example 5 | ○ | X | ○ |
| Comparative Example 1 | X | X | X |
| Comparative Example 2 | Δ | X | ○ |
| Comparative Example 3 | X | X | X |
| Comparative Example 4 | X | X | X |

The case where identification of letters etc. was made adequate by coloration upon rubbing the recording face with metal was expressed as ○, the case where identification of letters etc. was inadequate due to removal of the ink in spite of coloration of letters etc. was expressed as Δ, and the case where identification of letters etc. was difficult even after the recording face was rubbed with the metal was expressed as ×. With respect to anti-rubbing properties, the case where the surface layer was not removed after rubbed 50 times with a copper bar was expressed as ○, and the case where the surface layer was removed was expressed as ×. With respect to decomposition properties, the case where the original shape was lost after buried for 5 months in farm soil was expressed as ○ and the case where the original shape remained was expressed as ×.

What is claimed is:

1. A coloring mechanism wherein characters are indicated on a recording face by ink containing an inorganic pigment with a Mohs hardness of 2 or more, so as to have the same color as or a similar color to said recording face, and the characters are colored to be readable by rubbing the recording face containing the characters with metal.

2. A coloring mechanism according to claim 1, wherein the whiteness degree of the indicated characters based on JIS-P-8123 is within the range of P±5% relative to the whiteness degree P of the recording face.

3. A coloring mechanism wherein characters indicated on a recording face by a first ink containing an inorganic pigment with a Mohs hardness of 2 or more, and an indication making said characters unreadable by a second ink containing a pigment, and/or, a dye, a resin with lower hardness than said inorganic pigment and having the same color as or a similar color to said first ink, are indicated in combination and the characters are colored to be readable by rubbing the recording face containing the characters and the indication with metal.

4. A coloring mechanism according to claim 3, wherein the whiteness degree of the indicated characters based on JIS-P-8123 is within the range of Q±5% relative to the whiteness degree Q of the indication.

5. A recording material wherein characters are indicated on a part or the whole of at least one side of a base material as a recording face by ink containing an inorganic pigment with a Mohs hardness of 2 or more, so as to have the same color as or a similar color to said recording face, and the characters are colored to be readable by rubbing the recording face containing the characters with metal.

6. A recording material according to claim 5, wherein the whiteness degree of the indicated characters based on JIS-P-8123 is within the range of P±5% relative to the whiteness degree P of the recording face.

7. A recording material according to claim 5 wherein the recording face has been formed on a base material or on the surface of a recording layer provided on the base material.

8. A recording material according to claim 5 wherein the recording face is a coated face.

9. A recording material according to claim 5 wherein the base material is a biodegradable plastic film.

10. A recording material according to claim 5 wherein the base material is a fine hollow-containing plastic film with a hollow content of 10 to 60% by volume.

11. A recording material according to claim 5 wherein the base material is a coating paper.

12. A recording material wherein characters indicated on a part or the whole of a least one side of a base material as a recording face by a first ink containing an inorganic pigment with a Mohs hardness of 2 or more, and an indication making said characters unreadable by a second ink containing a pigment, and/or, a dye, a resin with lower hardness than said inorganic pigment and having the same color as or a similar color to said first ink, are indicated in combination and the characters are colored to be readable by rubbing the recording face containing the characters and the indication with metal.

13. A recording material according to claim 7 wherein the whiteness degree of the indicated characters based on JIS-P-8123 is within the range of Q±5% relative to the whiteness degree Q of the indication.

14. A recording material according to claim 12 wherein the recording face has been formed on a base material or on the surface of a recording layer provided on the base material.

15. A recording material according to claim 12 wherein the recording face is a coated face.

16. A recording material according to claim 12 wherein the base material is a biodegradable plastic film.

17. A recording material according to claim 12 wherein the base material is a fine hollow-containing plastic film with a hollow content of 10 to 60% by volume.

18. A recording material according to claim 12 wherein the base material is a coating paper.

* * * * *